United States Patent
Zhao

(10) Patent No.: US 10,019,780 B2
(45) Date of Patent: Jul. 10, 2018

(54) DATA TRANSFER METHOD, DATA TRANSFER MODULE, RELATED DISPLAY PANEL AND METHOD FOR DRIVING THE SAME, AND RELATED DISPLAY DEVICE

(71) Applicant: BOE TECHNOLOGY GROUP CO., LTD, Beijing (CN)

(72) Inventor: Hui Zhao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 22 days.

(21) Appl. No.: 15/030,957

(22) PCT Filed: Dec. 10, 2015

(86) PCT No.: PCT/CN2015/000883
§ 371 (c)(1),
(2) Date: Apr. 21, 2016

(87) PCT Pub. No.: WO2016/086509
PCT Pub. Date: Jun. 9, 2016

(65) Prior Publication Data
US 2016/0335741 A1    Nov. 17, 2016

(30) Foreign Application Priority Data

Dec. 5, 2014   (CN) .......................... 2014 1 0742033
Oct. 12, 2015  (CN) .......................... 2015 1 0657018

(51) Int. Cl.
G06T 3/40    (2006.01)
G09G 3/20    (2006.01)

(52) U.S. Cl.
CPC .................. *G06T 3/40* (2013.01); *G09G 3/20* (2013.01); *G09G 3/2003* (2013.01);
(Continued)

(58) Field of Classification Search
CPC ............. G09G 2340/0457; G09G 3/20; G09G 3/2096; G09G 2340/0407; G09G 3/2003; G06T 3/40
See application file for complete search history.

(56) References Cited

U.S. PATENT DOCUMENTS 8,797,344 B2    8/2014  Han et al.
9,195,356 B2 *  11/2015 Takahama ............... G06F 3/044
(Continued)

FOREIGN PATENT DOCUMENTS

CN    1677479 A    10/2005
CN    1866349 A    11/2006
(Continued)

OTHER PUBLICATIONS

The World Intellectual Property Organization (WIPO) International Search Report and Written Opinion for PCT/CN2015/000883 dated Mar. 1, 2016 p. 1-13.
(Continued)

*Primary Examiner* — Charles Hicks
(74) *Attorney, Agent, or Firm* — Anova Law Group, PLLC

(57) ABSTRACT

The present disclosure provides a method for transferring data for displaying images at a first resolution to a display panel of a second resolution, the first resolution being higher than the second resolution. The method includes steps of sequentially collecting and storing pixel data into primary caches; sequentially transferring the pixel data stored in the primary caches to a data processing unit; and applying a color mixing process to received pixel data according to a time-sharing operation to generate display data. The method also includes sequentially transferring the display data to secondary caches and repeating the steps until pixel data for a row of pixel structures corresponding to the first resolution are processed and stored in the secondary caches as display
(Continued)

data, and transferring the display data to a row of pixel structures corresponding to the second resolution.

22 Claims, 5 Drawing Sheets

(52) U.S. Cl.
CPC ... *G09G 3/2096* (2013.01); *G09G 2340/0407* (2013.01); *G09G 2340/0457* (2013.01)

(56) References Cited

U.S. PATENT DOCUMENTS

| | | | |
|---|---|---|---|
| 9,653,034 B2* | 5/2017 | Cho | G09G 3/3688 |
| 2005/0219409 A1 | 10/2005 | Cheng | |
| 2010/0026704 A1* | 2/2010 | Han | G09G 3/2003 |
| | | | 345/590 |
| 2014/0063033 A1 | 3/2014 | Bae et al. | |
| 2015/0325165 A1* | 11/2015 | Mori | G09G 3/2025 |
| | | | 345/698 |
| 2016/0335741 A1 | 11/2016 | Zhao | |

FOREIGN PATENT DOCUMENTS

| | | |
|---|---|---|
| CN | 101183521 A | 5/2008 |
| CN | 101292279 A | 10/2008 |
| CN | 101504827 A | 8/2009 |
| CN | 103065576 A | 4/2013 |
| CN | 104361854 A | 2/2015 |
| CN | 105118424 A | 12/2015 |
| JP | 2014016436 A | 1/2014 |
| KR | 20130000462 A | 1/2013 |

OTHER PUBLICATIONS

State Intellectual Property Office of the P.R.C (SIPO) Office Action 1 for 201510657018.3 dated Jun. 27, 2017 10 Pages (including translation).

* cited by examiner

DATA TRANSFER METHOD, DATA TRANSFER MODULE, RELATED DISPLAY PANEL AND METHOD FOR DRIVING THE SAME, AND RELATED DISPLAY DEVICE

CROSS-REFERENCES TO RELATED APPLICATIONS

This application is a national phase entry under 35 U.S.C. § 371 of International Application No. PCT/CN2015/000883, filed on Dec. 10, 2015, which claims priority to Chinese Patent Application No. CN201410742033.3, filed on Dec. 5, 2014, and Chinese patent application No. CN 201510657018.3, filed on Oct. 12, 2015. The above enumerated patent applications are incorporated by reference herein in their entirety.

FIELD OF THE DISCLOSURE

The present invention relates to the field of display technology and, more particularly, relates to a data transfer method, a data transfer module, a related display panel, a method for driving the display panel, and a related display device.

BACKGROUND

In a conventional flat-screen display device, the display panel often includes a plurality of pixel structures. Each pixel structure includes sub-pixel structures of the three primary colors, i.e., red (R), green (G), and blue (B). By adjusting the color of each sub-pixel structure, the grayscale of the pixel structures in the display panel can be adjusted and colorful images can be displayed. Accordingly, a software algorithm for displaying color images includes storing the image data for all pixel structures in one row, i.e., the RGB data of sub-pixel structures containing the corresponding color components, into the registers or caches, and calculate the RGB data of sub-pixel structures by a central processing unit (CPU). The RGB data of sub-pixel structures may be required for displaying images. The RGB data of sub-pixel structures may be stored in the caches or registers. Driving modules of the display panel (i.e., a hardware device such as a driving integrated circuit) outputs the RGB data of sub-pixel structures to display images.

With the development of display technology, display panels have higher display resolutions. In a display panel with high display resolution, the dimension of a single sub-pixel structure is usually measured in micrometers. The images or videos displayed by a display panel have better definition. However, to implement as many sub-pixel structures as possible in a display panel for high resolution display, the design and fabrication of the display panel can be very challenging.

Currently, high resolution algorithm (HRA) has been developed to achieve a virtual resolution higher than the physical resolution of the display panel under certain conditions. FIG. 1 shows an exemplary method of applying the HRA to obtain a virtual resolution higher than the physical resolution. In the display panel, sub-pixel structures are arranged repeatedly as RGBG. For example, the image resolution may be 1024×720. The pixel data input source may provide pixel data for 720 pixel structures in one row and store the data in the registers or caches of the driving integrated circuit (IC). The set of data for each pixel structure may include data for three RGB sub-pixel structures so that the data for 720 pixel structures may include data for 2160 sub-pixel structures. Suitable HRA algorithm may be applied on the pixel data to obtain second pixel data, repeatedly arranged as RGBG on the display panel. The second pixel data may be transferred and stored in corresponding registers or caches for sub-pixel structures arranged as RGBG. The driving module of the display panel (i.e., hardware devices such as driving IC) may transmit the pixel data, arranged in the pattern of RGBG on the display panel, to the corresponding sub-pixel structures or pixel structures for displaying images. Using this method, a display panel may display images with a resolution or virtual resolution higher than the physical resolution of the display panel.

In the driving process and data transfer process described above, the processes of inputting the pixel data, processing pixel data with HRA, and outputting pixel data may be separated. The timing of inputting pixel data and outputting pixel data do not affect each other. Thus, the driving process and the data transfer process may be very demanding on the registers in the driving IC. That is, the registers in the driving IC needs to buffer a large amount of pixel data such as pixel data for several rows of pixel structures or pixel data for several frames. More CPU may also be required for processing the pixel data. The driving IC may thus have increased capacity and increased power consumption requirements. The fabrication cost of the driving IC may be increased. Further, there may be increased delay in the pixel data output process. For example, the delay may be increased by the pixel clock cycles for several rows of pixel structures or for several frames.

Thus, a method that uses less computing resources and can reduce the delay in the processes of inputting and/or outputting pixel data is desired.

BRIEF SUMMARY OF THE DISCLOSURE

Directed to at least partially alleviate one or more problems set forth above and other problems in the art, the present disclosure provides a data transfer method, a related data transfer module, a display panel incorporating the data transfer module, a method for driving the display panel, and a display device incorporating the display panel. By using the data transfer method and the data transfer module, driving IC with less registers or registers with reduced capacity can be obtained. The display panel may have reduced delay when displaying images, and real-time performance of the display panel can be improved.

One aspect of the present disclosure provides a method for transferring data for displaying images at a first resolution to a display panel of a second resolution, the first resolution being higher than the second resolution. The method includes steps of sequentially collecting pixel data and storing the pixel data into primary caches; after collecting a subset of the pixel data for one row of pixel structures of the first resolution, sequentially transferring the pixel data stored in the primary caches to a data processing unit; and after transferring the subset of the pixel data for one row of pixel structures of the first resolution, applying a color mixing process to received pixel data according to a time-sharing operation to generate display data. The method also includes after processing the subset of the pixel data for one row of pixel structures of the first resolution, sequentially transferring the display data to secondary caches; and repeating steps for collecting pixel data, transferring collected pixel data from primary caches to the data processing unit, applying the color mixing process to generate display data, and transferring the display data to secondary caches until pixel data for a row of pixel structures corresponding to the first resolution are processed and stored in the secondary caches as display data, and transferring the display data to a row of pixel structures corresponding to the second resolution.

Optionally, the pixel data for the first resolution includes K sets of pixel data for one row of pixel structures; and the pixel structures corresponding to the second resolution includes M pixel structures in one row.

Optionally, when the secondary caches receive M sets of display data obtained from K sets of pixel data for one row of pixel structures, the display data are transferred to M pixel structures in the display panel.

Optionally, a timing to transfer a set of pixel data to the data processing unit and a timing to transfer an adjacent set of pixel data to the CPU are separated by one clock cycle.

Optionally, the method further includes sequentially transferring first i sets of pixel data to the data processing unit when at least i sets of pixel data are stored in the primary caches, K/i being a positive integer and i being a integer multiple of 2; the data processing unit receiving the i sets of pixel data and applying the color mixing process on the i sets of pixel data to obtain j sets of display data, a number of sub-pixel components in i sets of pixel data being larger than a number of sub-pixel components in j sets of display data; and sequentially transferring the j sets of display data to the secondary caches.

Optionally, a timing to transfer a group of i sets of pixel data to the data processing unit and a timing to transfer an adjacent group of i sets of pixel data to the data processing unit are separated by h clock cycles, h being a positive even integer larger than or equal to 2.

Optionally, the data processing unit includes h processing units, each executing the steps for collecting pixel data, transferring collected pixel data from primary caches to the data processing unit, applying the color mixing process to generate display data, and transferring the display data to secondary caches.

Optionally, a set of pixel data includes data for a plurality of first sub-pixel components of different colors; and a set of display data includes data for a plurality of second sub-pixel components, a portion of the second-pixel having a same color.

Optionally, the method includes applying the color mixing process on neighboring first sub-pixel components of corresponding colors to obtain second sub-pixel components of different colors, or reusing first sub-pixel components of corresponding colors to obtain the second sub-pixel components of different colors; and applying the color mixing process on neighboring first sub-pixel components of corresponding colors to obtain second sub-pixel components of the same color, or reusing first sub-pixel components of corresponding colors to obtain the second sub-pixel components of the same color.

Optionally, the method further includes applying the color mixing process on the first sub-pixel components of i sets of pixel data to obtain j sets of display data, wherein: a set of pixel data includes three first sub-pixel components, each have a different color from another; a set of display data includes four second sub-pixel components, two of the four second sub-pixel components having a same color and other two of the four second sub-pixel components each having a different color than each other and the two second sub-pixel components of the same color, the two second sub-pixel components of the same color are separated by one other sub-pixel component of a different color; and one of the two second sub-pixel components of the same color and a neighboring second sub-pixel component of a different color form a set of sub-pixel data, two sets of sub-pixel data form a set of display data.

Optionally, the color mixing process includes one or more of an averaging method, a weighted averaging method, a square root method, and a median filtering method.

Optionally, the color mixing process further includes forming a two dimensional mapping table including the correspondence relation between a first sub-pixel component and a second sub-pixel component before the color mixing process; input data of the mapping table including brightness levels of two first sub-pixel components of the same color; and output data of the mapping table including integrated brightness levels of second sub-pixel components of corresponding colors to the first sub-pixel components; and inputting neighboring first sub-pixel components as the input of the mapping table for querying output data of corresponding colors to obtain second sub-pixel components of the display data.

Optionally, the pixel data includes red sub-pixel components, green sub-pixel components, and blue sub-pixel components; the two second sub-pixel components of the same color are green sub-pixel components; and a set of sub-pixel string data includes a combination of a red sub-pixel component and a green sub-pixel component and a combination of a blue sub-pixel component and a green sub-pixel component, or a combination of a green sub-pixel component and a red sub-pixel component and a combination of a green sub-pixel component and a blue sub-pixel component. The pixel data also includes a set of display data includes two sets of sub-pixel string data, the two green sub-pixel components being separated by a sub-pixel component of a different color.

Optionally, each set of pixel data forms a set of sub-pixel string data through the color mixing process; and i sets of sub-pixel string data form j sets of display data, j=i/2.

Optionally, each display data pixel structure includes four sub-pixel structures; and two of the four sub-pixel structures have a same color and are separated by a sub-pixel structure of a different color.

Another aspect of the present disclosure provides a method for driving a display panel, including the disclosed method for transferring data for displaying images, wherein display data formed based on pixel data for one row of K pixel structures is configured to drive one row of M pixel structures.

Optionally, the pixel data for one row of K pixel structures are processed by pipeline processing sequentially in the primary caches, a same data processing unit, and the secondary caches to form display data for one row of M pixel structures.

Another aspect of the present disclosure provides a data transfer module, configured to transfer data for a first resolution to a display panel of a second resolution for displaying, the first resolution being higher than the second resolution. The data transfer module includes primary caches, configured to receive pixel data sequentially, store the pixel data sequentially in the primary caches, and transfer the pixel data to a data processing unit; the data processing unit, configured to receive the pixel data and apply a color mixing process on the pixel data according to a time-sharing operation to obtain display data, and transfer the display data to secondary caches; and the secondary caches, configured to receive the display data, store the display data in the secondary caches, and transfer the display data to a row of pixel structures.

Optionally, the pixel data for the first resolution includes K sets of pixel data for one row of pixel structures; and the pixel structures corresponding to the second resolution includes M pixel structures in one row.

Optionally, when the secondary caches receive M sets of display data obtained from K sets of pixel data for one row of pixel structures, the display data are transferred to M pixel structures in the display panel.

Optionally, the primary caches sequentially transfers first i sets of pixel data to the data processing unit when at least i sets of pixel data are stored in the primary caches, K/i being a positive integer and i being a integer multiple of 2; the data processing unit receives the i sets of pixel data and applies the color mixing process on the i sets of pixel data to obtain j sets of display data, a number of sub-pixel components in i sets of pixel data being larger than a number of sub-pixel components in j sets of display data; and the data processing unit sequentially transfers the j sets of display data to the secondary caches.

Optionally, a set of pixel data includes a plurality of first sub-pixel components of different colors; and a set of display data includes a plurality of second sub-pixel components, a number of the second sub-pixel having a same color; the data processing unit includes h processing units for repeatedly receiving pixel data from K/i groups, the processing units receiving the pixel data and applying the color-mixing process on the pixel data to obtain the display data, h being an even number larger than or equal to 2; applying the color mixing process on neighboring first sub-pixel components of corresponding colors to obtain second sub-pixel components of different colors, or reusing first sub-pixel components of corresponding colors to obtain the second sub-pixel components of different colors; and applying the color mixing process on neighboring first sub-pixel components of corresponding colors to obtain second sub-pixel components of the same color, or reusing first sub-pixel components of corresponding colors to obtain the second sub-pixel components of the same color.

Optionally, a set of pixel data includes three first sub-pixel components, each have a different color from another; a set of display data includes four second sub-pixel components, two of the four second sub-pixel components having a same color and other two of the four second sub-pixel components each having a different color than each other and the two second sub-pixel components of the same color, the two second sub-pixel components of the same color are separated by one other sub-pixel component of a different color; one of the two second sub-pixel components of the same color and a neighboring second sub-pixel component of a different color form a set of sub-pixel data, two sets of sub-pixel data form a set of display data; and applying the color mixing process on the first sub-pixel components of i sets of pixel data to obtain j sets of display data.

Another aspect of the present disclosure provides a display panel, including a display screen incorporating the disclosed data transfer module.

Optionally, each row of the display panel includes M display pixel structures; and each pixel structure includes four sub-pixel structures, and two of the four sub-pixel structures having the same color and being separated by a sub-pixel structure of a different color.

Another aspect of the present disclosure provides a display device, including the disclosed display panel.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
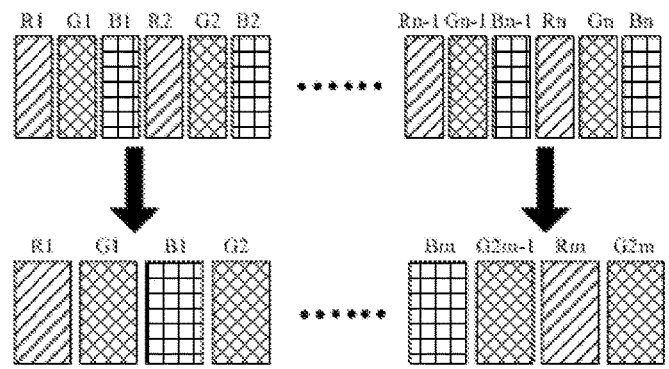
FIG. 1 illustrates an exemplary application of the conventional high resolution algorithm (HRA)

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the invention.

The present disclosure takes advantage of the timing correlation and the cycling repetition between the RGB pixel data input source (i.e., pixel data for high resolution display) and the RGBG pixel data output. Pattern or correlation between the input pixel data and the output pixel data may be obtained. The pattern may be used to simplify the implementation of conventional HRA by improving the timing loops between the input pixel data and the output pixel data. In the present disclosure, one CPU may be used repeatedly in loop operations to complete conversion of pixel data and data transfer process. Driving groups may be formed and may be driven in loop operations. Thus, images with a resolution higher than the physical resolution of the display panel can be displayed by the display panel. The disclosed data transfer method and data transfer module may be less demanding on the capacity of the registers or caches. The disclosed data transfer method and data transfer module may further reduce the delays when displaying images so that the quality for displaying real-time images can be improved.

Embodiment One

Embodiment one of the present disclosure provides a data transfer method and a corresponding data transfer module. According to the data transfer method, only a relatively small quantity of CPU capacity may be required for the data transfer method. The data transfer method may be suitable for a display panel with M pixel structures in a row to display data for K sets of pixel data for a row. The number of sub-pixel structures in the M pixel structures may be larger than the number of sub-pixel components in the K sets of pixel data. The disclosed method reduces the cost to transfer data.

The CPU in the present disclosure may be any suitable data processing unit. The CPU may include a processor, a random access memory (RAM) unit, a read-only memory (ROM) unit, a storage unit, a display, an input/output interface unit, a database; and a communication interface. Other components may be added and certain devices may be removed without departing from the principles of the disclosed embodiments.

In a display panel suitable for the data transfer method, each pixel structure may include four sub-pixel structures. Two of the four sub-pixel structures may have the same color and may be separated by one sub-pixel of a different color.

It should be noted that, in a display panel, rows and columns of pixel structures may be divided according to the orientation of the display panel and/or the user's viewing angle. That is, the rows and the columns of pixel structures may be relative. In embodiment one, the data transfer method is illustrated by data transfer in rows of pixel structures. Accordingly, the data transfer in rows of pixel structures using the disclosed data transfer method can be applied on data transfer in columns of pixel structures according to certain coordinate relationship between rows and columns. Data transfer in rows of pixel structures or in columns of pixel structures should be determined according to different applications or designs and should not be limited by the embodiments of the present disclosure.

Figure 7:
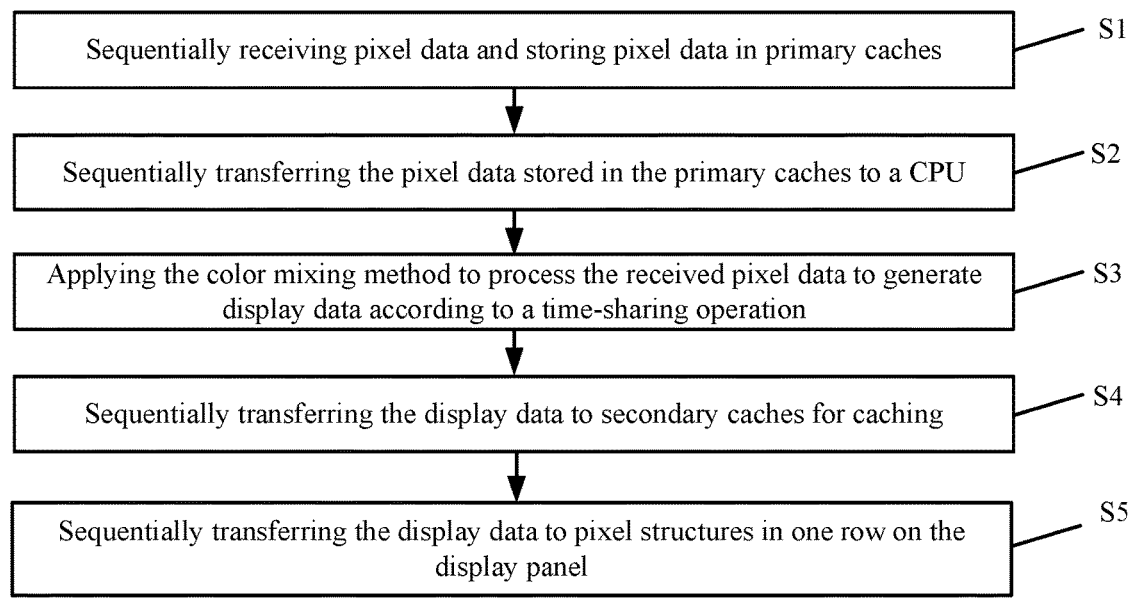
FIG. 7 illustrates a flow chart of an exemplary data transfer process according to the disclosed embodiments.

FIG. 7 illustrates a flow chart of an exemplary data transfer process. As shown in FIG. 7, the data transfer process may include steps S1 to S5.

In step S1, pixel data may be received sequentially and stored in primary caches. Each row of image data may include K sets of pixel data.

Figure 4:
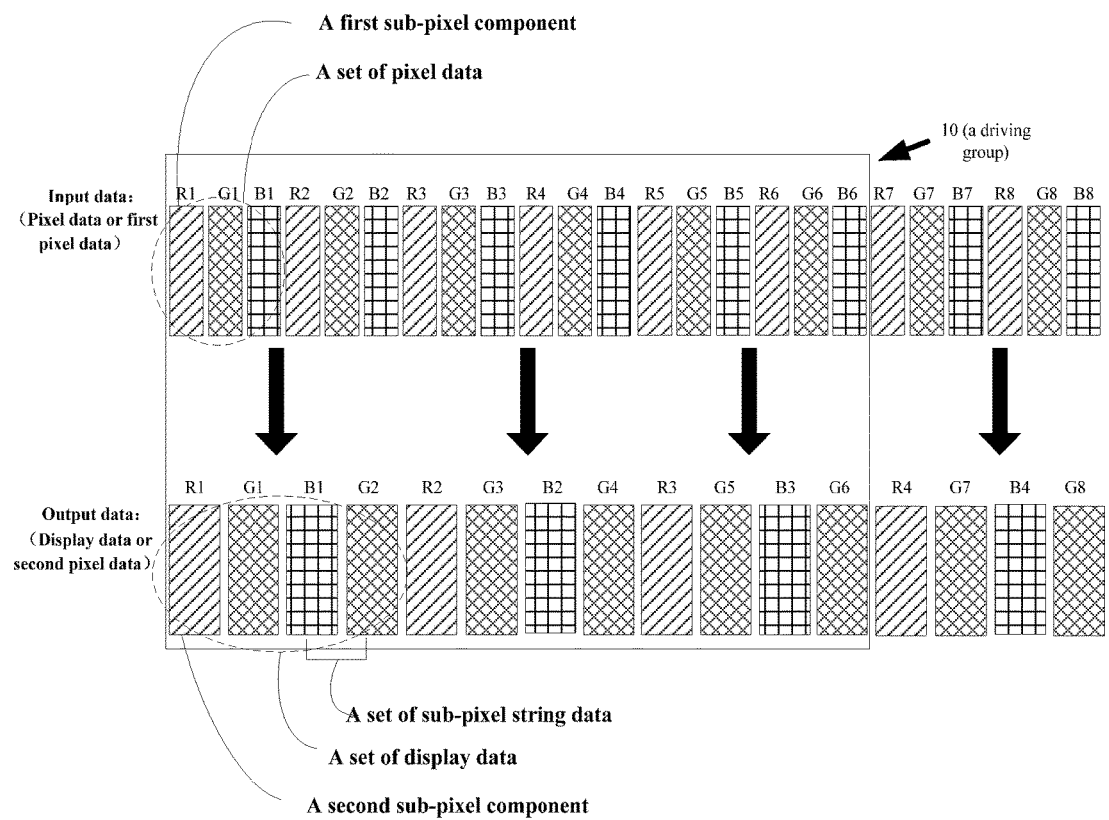
FIG. 4 illustrates an exemplary color mixing process according to the embodiments of the present disclosure.

In step S1, pixel data may be received in a sequential manner and stored in the primary caches. As shown in FIG. 4, each set of the pixel data may include a plurality of first sub-pixel components of different colors. For example, each set of the pixel data may include first sub-pixel components of three different colors. The color of each sub-pixel component may be displayed in different brightness levels. The combination of different brightness levels of the sub-pixel components may form various brightness levels and/or colors of one pixel point within the visible range.

In step S2, the pixel data stored in the primary caches may be sequentially transferred to a CPU. Preferably, when the number of pixel data sets stored in the primary caches reaches at least i, the first i sets of pixel data may be transferred to the CPU. K/i may be a positive integer with i being an integer multiple of 2.

In step S2, the transfer of two neighboring sets of pixel data to the CPU may be separated by one clock cycle. Each group of pixel data may contain i sets of pixel data. The transfer of two neighboring groups of pixel data to the CPU may be separated by h clock cycles. h may be an even integer larger than or equal to 2. h may be equal to the number of processing units in the CPU.

It should be noted that, in step S2, the i sets of pixel data being transferred to the CPU as a group may only be an embodiment of the disclosed method. The transfer of i sets of pixel data to the CPU as a group may have a main advantage in applying the color mixing process on neighboring pixel data sets to obtain display data. According to different color mixing processes implemented by the CPU, the received pixel data may also be sequentially transferred to the CPU set by set. The display data obtained after the processing of the CPU may be transferred to secondary caches set by set. The h processing units of the CPU may be used repeatedly. Pipeline processing for converting pixel data to display data can be implemented.

In step S3, the CPU may receive the pixel data and apply a color mixing process on the received pixel data to obtain display data according to a time-sharing operation. An exemplary color mixing method is later described in relation to FIG. 5.

For example, the CPU may receive the i sets of pixel data and apply the color mixing process on the i sets of pixel data to generate j sets of display data. The number of sub-pixel components in the i sets of pixel data may be larger than the number of sub-pixel components in the j sets of display data.

Referring to FIG. 4, as an example, each set of display data may include a plurality of second sub-pixel components. Certain second sub-pixel components may have the same color. For example, as shown in FIG. 4, each set of display data may include four second sub-pixel components. Two of the four second sub-pixel components may have the same color. The other two of the four second sub-pixel components may each have different colors. The two second sub-pixel components with the same color may be separated by a sub-pixel component of a different color. One of the two second sub-pixel components with the same color and one adjacent second sub-pixel component of a different color may form a set of sub-pixel string data. Two sets of the second sub-pixel string data may form a set of display data. Each processing unit of the CPU may apply the color mixing on a set of pixel data to obtain a set of sub-pixel string data. Two sets of sub-pixel data may form a set of display data. By applying the color mixing process on all the first sub-pixel structures components in the i sets of pixel data, j sets of display data can be obtained.

Figure 5:
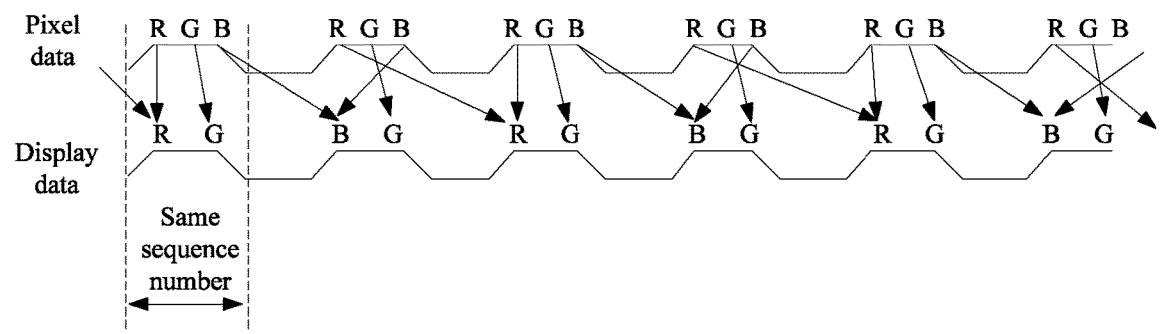
FIG. 5 illustrates an exemplary conversion from pixel data to display data according to the color mixing process in FIG. 4.

Referring back to FIG. 7, in step S3, the color mixing process may include the following implementations. In one example, as shown in FIG. 5, the two second sub-pixel components of different colors in a set of display data may be obtained by applying the color mixing process on the first sub-pixel components in the neighboring sets of first pixel data. The colors of the first sub-pixel components in the neighboring sets of pixel data may be corresponding to the color of the two second sub-pixel components. The two second sub-pixel components of different colors in a set of display data may also be obtained by reusing first sub-pixel components with corresponding colors to the two second sub-pixel components of different colors. The two second sub-pixel components of the same color in a set of display data may be obtained by applying the color mixing process on the first sub-pixel components in the neighboring sets of pixel data. The colors of the first sub-pixel components in the neighboring sets of pixel data may be corresponding to the color of the two second sub-pixel components of the same color. The two second sub-pixel components of the same color in a set of display data may also be obtained by reusing first sub-pixel components with corresponding colors to the two sub-pixel components of the same color.

That is, to obtain the second sub-pixel components from the first sub-pixel components using the color mixing process, the second sub-pixel components of the same color in a set of sub-pixel string data in the display data may be obtained by directly reusing the first sub-pixel components with corresponding colors, where the first sub-pixel components may be contained in the set of pixel data with the same sequence number as the set of the display data. The second sub-pixel components may also be obtained by applying the color mixing process on the first sub-pixel components with corresponding colors in neighboring sets of pixel data. The second sub-pixel components of different colors in a set of sub-pixel string data of a set of display data may also be obtained through the same means. The color mixing process described above is easy to implement and can substantially ensure the display information in the pixel data for high resolution display can be preserved in the display data. As such, images displayed may be richer or more colorful with improved fidelity.

It should be noted that, for the first i sets of pixel data or the last i sets of pixel data in K sets of pixel data, first sub-pixel components in one set of the pixel data may be reused to obtain second sub-pixel components in a corresponding set of display data. The first sub-pixel components may have corresponding colors to the second sub-pixel components. The sequence number of the set of the pixel data may be the same as the sequence number of the set of display data. For the pixel data other than the first i sets or the last i sets of pixel data, the color mixing process and/or the reusing process may be applied to obtain the second sub-pixel components in the corresponding display data. The specific means to obtain the second sub-pixel components are not limited by the embodiments herein.

Figure 6:
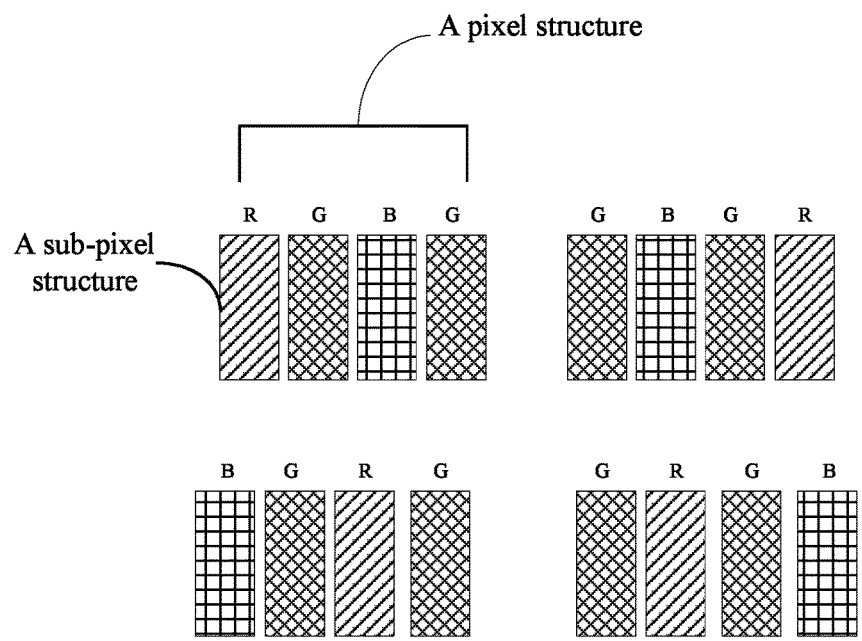
FIG. 6 illustrates an exemplary arrangement of the pixel structure according to the disclosed embodiments.

Display data may be obtained by mixing the first sub-pixel components in neighboring sets of pixel data. Specifically, as shown in FIG. 5, a set of pixel data may include three first sub-pixel components, i.e., a red second sub-pixel component, a green second sub-pixel component, and a blue sub-pixel second component. A red second sub-pixel component may represent a second sub-pixel component for emitting red light; a green second sub-pixel component may represent a second sub-pixel component for emitting green light; and a blue second sub-pixel component may represent a second sub-pixel component for emitting blue light. As shown in FIG. 5, in the display data, the two second sub-pixel components of the same color may be the green second sub-pixel components. Two sets of sub-pixel string data may include a combination of a red second sub-pixel component and a green second sub-pixel component and a combination of a blue second sub-pixel component and a green second sub-pixel component. Two sets of sub-pixel string data may also include a combination of a green second sub-pixel component and a red second sub-pixel component and a combination of a green second sub-pixel component and a blue second sub-pixel component. A set of display data may include two sets of sub-pixel string data, where the two green sub-pixel components are separated by another (i.e., red or blue) sub-pixel component. FIG. 6 illustrates an exemplary arrangement of pixel structures for displaying the display data according to the present disclosure. Based on the display data with sub-pixel string data described above, the pixel structures may include arrangement or configuration such as RGBG, GRGB, BGRG, and GBGR.

More specifically, referring back to the data transfer process as shown in FIG. 4, each set of pixel data may include three first sub-pixel components arranged as RGB. Six sets of pixel data may include 18 first sub-pixel components. Each set of display data may include four second sub-pixel components arranged as RGBG. Three sets of display data may include 12 second sub-pixel components. The color mixing process may be applied on each set of pixel data to obtain a set of sub-pixel string data. For the set of pixel data and the corresponding set of sub-pixel string data, with the same sequence number, the value of a second sub-pixel component may be obtained by reusing the value of the first sub-pixel component with the corresponding color. The value of the second sub-pixel component may also be obtained by applying the color mixing process on neighboring first sub-pixel components. The second sub-pixel component may be a blue second sub-pixel component, a red second sub-pixel component, and/or a green second sub-pixel component. Two sets of sub-pixel string data may form a set of display data. Thus, three sets of display data (i.e., the 12 second sub-pixel components shown in the dashed box of 10 of FIG. 4) can be obtained.

Figure 3:
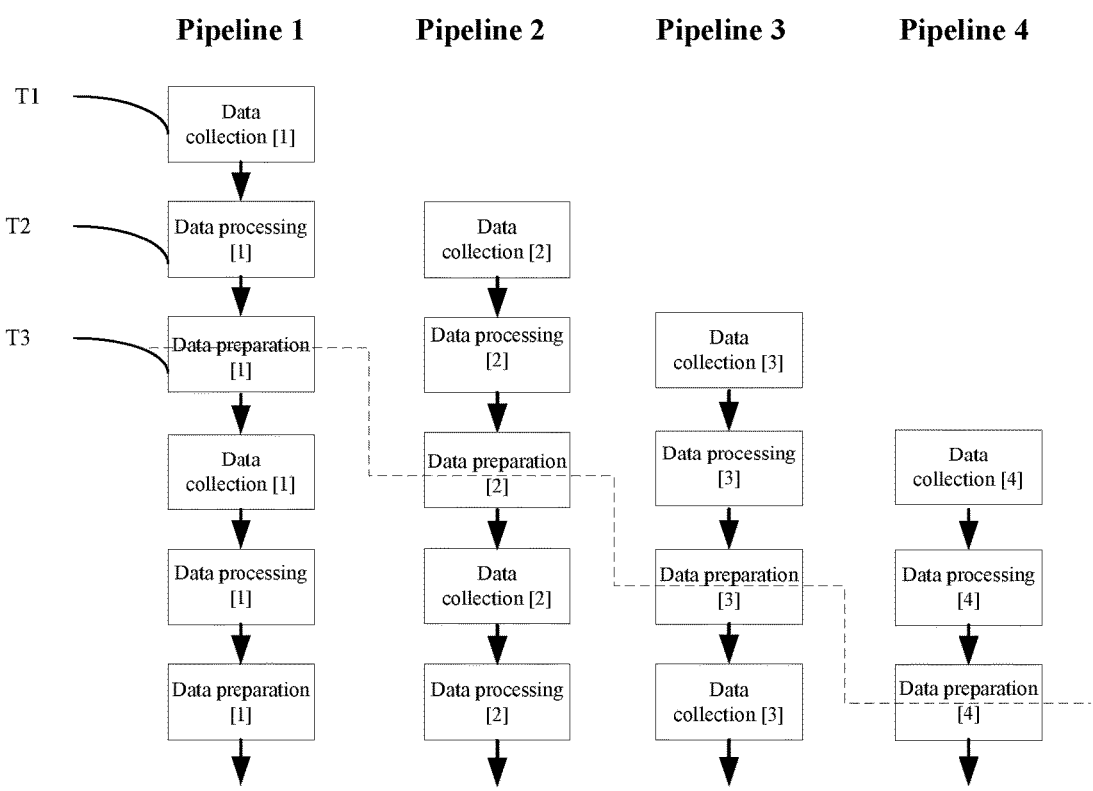
FIG. 3 illustrates an exemplary pipeline processing operation according to embodiment one of the present disclosure.

In the process to obtain the display data from the pixel data using the color mixing process, as shown in FIG. 4, the processing units applying the color mixing process may have four processing units shown in FIG. 3. Four pipelines may be formed to convert four sets of sub-pixel string data to two sets of display data. In other words, the conversion between one of the two sub-pixel components with the same color (e.g., green) and a sub-pixel component with a different color (e.g., red or blue) may be described as one of reusing-reusing, reusing-color mixing, color mixing-reusing, and color mixing-color mixing processes. The conversion may be determined or adjusted according to different applications and/or designs and should not be limited by the embodiments of the present disclosure.

Figure 2:
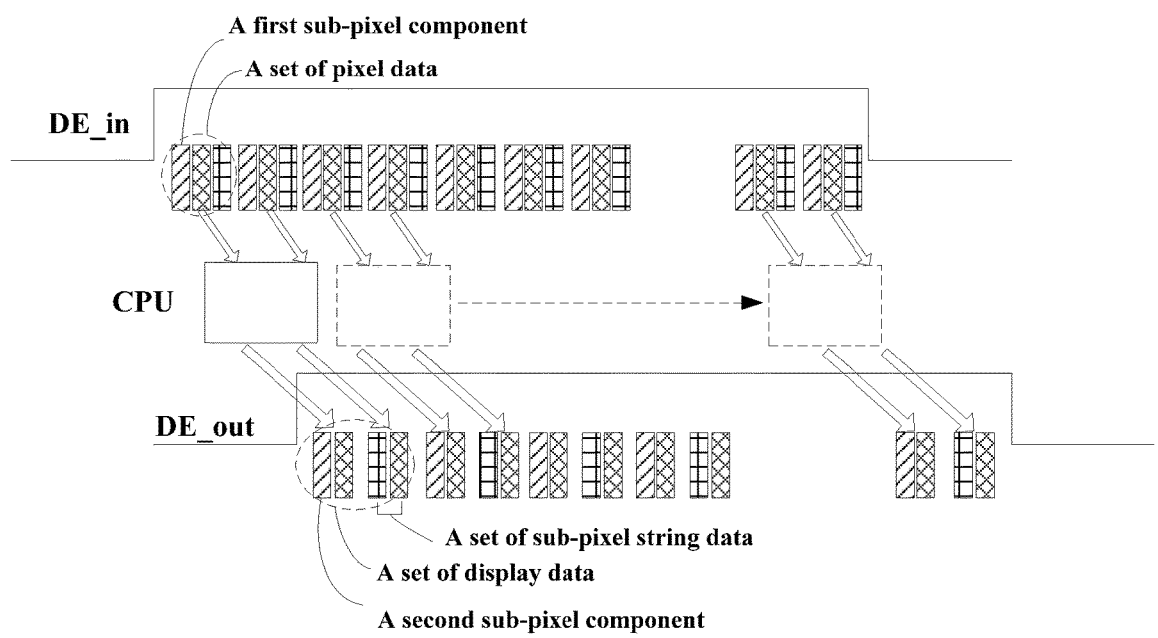
FIG. 2 illustrates an exemplary data transfer process according to embodiment one of the present disclosure.

An exemplary data transfer method is further illustrated in FIG. 2. When DE in signal is a high voltage, the pixel data may be effective, i.e., ready for transfer. The CPU may collect or sample the first 0-h sets of pixel data. The 0 to h sets of pixel data may refer to the $0^{th}$ to the $h^{th}$ sets of pixel data. The 0 to h sets of pixel data may be sequentially distributed or assigned to the processing units of the CPU. Each processing unit may process one set of pixel data and further output a set of sub-pixel string data to the a secondary cache. When each of the processing units of the CPU completes processing the pixel data, the CPU may further collect another or new 0 to h sets of pixel data and transfer the pixel data to the processing units. The processing units may start processing the new 0 to h sets of pixel data. The processing units of the CPU may be operated in a time-sharing operation to improve the utilization of the driving circuit. Thus, after h clock cycles, the CPU may continue to collect the h to (2h+1) sets of pixel data, i.e., the new 0 to h sets of pixel data. Each processing unit may process one set of pixel data and further output a set of sub-pixel string data to a secondary cache, and so on.

By applying the color mixing process and the correspondence relation between the first sub-pixel components and the second sub-pixel components, each pixel data may form a set of sub-pixel string data. Thus, i sets of sub-pixel strings may form j=i/2 sets of display data.

In some embodiments, the color mixing process may be one or more of an averaging method, a weighted average method, a square root method, a median filtering method, or any other suitable methods. Details of the methods are not described herein.

In some embodiments, another color mixing process may be used. The color mixing process may include forming a mapping table including the correspondence relation between a first sub-pixel component and a second sub-pixel component before the color mixing process. The mapping table may be a two dimensional table. For example, the input data of the mapping table may include the brightness levels of two first sub-pixel components of the same color. The output data of the mapping table may include the integrated brightness levels of second sub-pixel components. The second sub-pixel components may have corresponding colors to the first sub-pixel components.

In the color mixing process, the first sub-pixel components in the neighboring sets of pixel data with the same color may be used as the input data for the mapping table.

The mapping table may be used to configure the output data with corresponding colors to the input data. The second sub-pixel components of the display data, with the corresponding colors to the first sub-pixel components, may be obtained.

Referring back to FIG. 7, in step S4, the display data may be transferred sequentially to the secondary caches for caching or buffering. Preferably, j sets of display data may be transferred to the secondary caches for caching or buffering.

In step S4, the j sets of display data may be transferred to the secondary caches for caching at once, where the j sets of display data may be transferred according to a certain sequence. Alternatively, each one of the j sets of display data may be transferred to a secondary cache for caching after obtained by the CPU. Thus, the CPU may be used repeatedly to implement pipelining processing. The display data may be formed from the pixel data by the pipelining processing.

By repeating steps S2 through S4, i.e., transferring the pixel data stored in the primary caches to the CPU to form the display data and transferring the display data from the CPU to the secondary caches multiple times, K sets of pixel data for pixel structures in a row may be converted into the corresponding display data.

Referring to FIG. 7, in step S5, after the secondary caches receive the M sets of display data, converted from the K sets of pixel data for pixel structures in one row, the secondary caches may transfer the display data sequentially to the M pixel structures in one row on the display panel.

In step S5, the processed display data may be transferred to a driving module of the display panel. Based on the scanning sequence of the driving module on the pixel structures, the display data for the M pixel structures in a row on the display panel may be used to determine the portion of an image displayed by the row.

As shown in FIG. 2, when the DE_out signal is a high voltage, the display data may be effective, i.e., ready for transfer. The display data stored in the secondary caches may be transferred to the display panel or to the driving module of the display panel.

Accordingly, the present disclosure also provides a data transfer module. The data transfer module may be configured to transfer the K sets of pixel data to a display panel with M sets of pixel structures per row for displaying images. The number sub-pixel structures in the M sets of pixel structures may be larger than the number of sub-pixel components in the K sets of pixel data. The data transfer module may include primary caches, a CPU and secondary caches.

The primary caches may be configured to sequentially receive and store the received pixel data. The primary caches may sequentially transfer the pixel data to the CPU. Preferably, when the number of pixel data stored in the primary caches reaches at least i sets, the primary caches may transfer the first i sets of pixel data to the CPU. K/i may be a positive integer and i may be a positive multiple of 2.

The CPU may be configured to sequentially receive the pixel data and apply the color mixing process on the received pixel data to obtain display data. The CPU may be operated in a time-sharing operation to apply the color mixing process on the pixel data. The CPU may also sequentially transfer the obtained display data to the secondary caches. Preferably, the CPU may be configured to sequentially receive i sets of pixel data and apply the color mixing process on the i sets of pixel data to obtain j sets of display data. The number of sub-pixel components in the i sets of pixel data may be larger than the number of sub-pixel components in the j sets of display data. The CPU may transfer the j sets of display data sequentially to the secondary caches for caching.

The secondary caches may be configured to sequentially receive and store the display data. After the secondary caches receive the M sets of display data, obtained from processing the K sets of pixel data for pixel structures in one row, the secondary caches may transfer the M sets of display data, to M pixel structures in a row on the display panel. The M sets of display data may be all the data stored in the secondary caches.

In the data transfer module, each set of pixel data may include a plurality of first sub-pixel components of different colors; and each set of display data may include a plurality of second sub-pixel components. Certain second sub-pixel components may have the same color.

The CPU may include h processing units to receive and process K/i groups of pixel data according to a loop operation. The processing units of the CPU may sequentially receive the pixel data and apply the color mixing process on the pixel data to obtain display data. h may be a positive even integer larger than or equal to 2.

The two second sub-pixel components of different colors in a set of display data may be obtained by applying the color mixing process on the first sub-pixel components in the neighboring sets of pixel data. The colors of the first sub-pixel components in the neighboring sets of pixel data may be corresponding to the colors of the two second sub-pixel components of different colors. The two second sub-pixel components of different colors in a set of display data may also be obtained by using first sub-pixel components with corresponding colors to the two sub-pixel components of different colors. The two second sub-pixel components of the same color in a set of display data may be obtained by applying the color mixing process on the first sub-pixel components in the neighboring sets of pixel data. The color of the first sub-pixel components in the neighboring sets of pixel data may be corresponding to the color of the two second sub-pixel components of the same color. The two second sub-pixel components of different colors in a set of display data may also be obtained by using first sub-pixel components with corresponding colors to the two sub-pixel components of the same color.

That is, to obtain the second sub-pixel components from the first sub-pixel components using the color mixing process, the second sub-pixel components of the same color in a set of sub-pixel string data of a set of display data may be obtained by directly reusing the first sub-pixel components with the corresponding colors to the second sub-pixel components, where the first sub-pixel components may be contained in the set of pixel data with the same sequence number as the set of the display data. The second sub-pixel components may also be obtained by applying the color mixing process on the first sub-pixel components with corresponding color in neighboring sets of pixel data. The second sub-pixel components of different colors in a set of sub-pixel string data of a set of display data may also be obtained through the same means.

Meanwhile, similar to the data transfer method, for the pixel data and the sets of sub-pixel string data that share the same sequence number, the conversion or process from one sub-pixel to another sub-pixel, with a same color and with a different color, respectively, may include one of the combinations of reusing-reusing, reusing-color mixing, color mixing-reusing, and/or color mixing-color mixing. The combinations described may be used or adjusted according to different applications or designs. The term "color mixing" may refer to a process of applying the color mixing process on the one sub-pixel with certain other sub-pixels to obtain a sub-pixel with a same or different color. The term "reusing" may refer to a process of reusing the color of the one sub-pixel to obtain a sub-pixel with a same color.

As referring to FIG. 4, each set of pixel data may include three first sub-pixel components of different colors. Each set of display pixel data may include four second sub-pixel components. Two of the four second sub-pixel components may have the same color. The other two of the four second sub-pixel components may have different colors, each being different from the other. The two second sub-pixel components with the same color may be separated by one sub-pixel component of a different color. One of the two second sub-pixel components with the same color and one adjacent second sub-pixel component of a different color may form a set of sub-pixel string data. Two sets of sub-pixel string data may form a set of display data. The color mixing process may be applied on the first sub-pixel components in the i sets of pixel data by the CPU to obtain j sets of display data.

Referring to FIG. 2, the CPU may process all received pixel data to obtain the display data. No pixel data or display data is left out. In FIG. 2, except for the first processing unit, all the other processing units are drawn in dashed lines. The processing units shown in the dashed lines illustrate the same CPU used for the time-sharing operation, i.e., the same CPU used repeatedly for different or consecutive loop operations.

In the data transfer method and the data transfer module provided by the present disclosure, the CPU may be repeatedly used in different loop operations to transfer and process data. Less caches or registers capacities may be required for the caching and processing of the display data. As a result, requirements on the capacity and the number of the caches in the CPU may be greatly reduced. The cost of the hardware device may be reduced.

Embodiment Two

Based on embodiment one, embodiment two of the present disclosure further provides a display panel and a method for driving the display panel.

According to the method for driving the display panel, display data formed based on pixel data for one row of K pixel structures may be configured to drive one row of M pixel structures. The pixel data for one row of K pixel structures are processed by pipeline processing sequentially in the primary caches, a same CPU, and the secondary caches to form display data for one row of M pixel structures.

The display panel may include a display screen and the data transfer module disclosed in embodiment one. Each row of the display screen may include M pixel structures. Each pixel structure may include four sub-pixel structures. Two of the four sub-pixel structures may have of display the same color. The two sub-pixel structures with the same color may be separated by one sub-pixel structure with a different color.

In one embodiment, the display panel may include a plurality of pixel structures arranged in an M×N array. The K sets of pixel data corresponding to one row of pixel structures may be processed sequentially in the primary caches, the same CPU, and the secondary caches, respectively. Display data corresponding to M pixel structures may be formed through pipeline processing. Specifically, neighboring i sets of pixel data for a same row or a same column may form a driving group. The CPU may drive or process the neighboring i sets of pixel data or the driving group in certain loop operations. For the K/i driving groups, two adjacent groups of pixel data may be driven at two different driving timings separated by h clock cycles. The number of clock cycles, h, may be equal to the number of processing units in the CPU. During the h clock cycles, a group of pixel data may be outputted from the CPU to a register. The register may correspond to the secondary cache in embodiment one. The disclosed method may enable pixel data for a resolution of K×L to be displayed well by a display panel with a physical resolution of M×N. K may be larger than or equal to M (K≥M). According to the correspondence relation between rows and columns, L may be larger than or equal to N (L≥N). In the method described above, i may be a positive multiple of 2.

In a display panel, the clock cycle is a crucial timing signal. The clock cycle is conventionally defined as the time interval between two adjacent pixel clock signals. The frequency of the pixel clock signal is correlated to the operation mode of the display panel. A higher resolution of the display panel often indicates a higher frequency of the pixel clock signal. The number of the pixel clock signals for a row of pixel structures may be equal to the number of pixel structures in the row of the display panel. For example, in a display panel with a resolution of 1024×768, one row of pixel structures on the display panel may include 1024 pixel structures. Thus, the number of pixel clock signals for one row corresponding to the effective video area may also be 1024.

The pixel clock signals may have two functions. First, the pixel clock signals may be used to control pixel data signals, e.g., RGB signals, to be transferred according to certain sequences. The pixel data signals may be transferred by the driving IC to the display panel according to certain sequences so that pixel structures in each row and/or each column may be operated in a proper order or sequence. Further, the pixel clock signals may be used to ensure the accuracy of data transfer. In one embodiment, the pixel clock signals may be the pixel clock signals for the M×N array of pixel structures.

In one embodiment, a display panel with a lower resolution of M×N may be used. Pixel data corresponding to a resolution higher than M×N may be inputted into the display panel to realize displaying images of a higher resolution of K×L. Each set of pixel data corresponding to the resolution of K×L may include three sets of sub-pixel data, each having a different color. Each pixel structure corresponding to the resolution of M×N may include four sub-pixel structures. Two sub-pixel structures of the four sub-pixel structures may have the same color. The four sub-pixel structures may correspond to the sub-pixel structures in embodiment one. Three sets of sub-pixel data, each representing a different color, may be inputted into three of the four sub-pixel structures. The three sets of sub-pixel data may be obtained by applying the color mixing process on the sub-pixel data corresponding to the resolution of K×L. Specifically, each set of pixel data corresponding to the resolution of K×L may include a set of red sub-pixel data (R), a set of green sub-pixel data (G), and a set of blue sub-pixel data (B). Each pixel structure corresponding to the resolution of M×N may include four sub-pixel structures arranged as RGBG, GRGB, BGRG, or GBGR. Because human eyes are more sensitive to green, the arrangement of sub-pixel structures may enable the images displayed by the display panel to be richer.

Preferably, in one embodiment, i, the number of neighboring pixel data sets a driving group in one row or one column, may be equal to 6. That is, each six sets of pixel data may form a driving group. The pixel data may form a plurality of driving groups to be sequentially transferred to CPU. The CPU may be operated repeatedly in different loop operations to process the driving groups and obtain display data for driving the display panel. As shown in FIG. 4, in one embodiment, the data processing by the CPU on each driving group may form a repeating logic unit 10. The repeating logic unit 10 may include six sets of pixel input data and three sets of actual pixel output data. The three sets of actual pixel data may correspond to the display data in embodiment one, and the six sets of pixel input data may correspond to the pixel data in embodiment one. In each driving group, the correspondence relation between the six sets of pixel input data and the three sets of actual pixel output data may be the same. That is, pixel data may be grouped according to a same pattern to form driving groups to be transferred sequentially.

In one embodiment, the CPU used for the color mixing process may include h processing units, where h is a positive even integer larger than or equal to 2. Each processing unit may form a pipeline. A processing unit may apply the color mixing process on the set of pixel data and/or neighboring sets of pixel data inputted into the processing unit to obtain and output a set of sub-pixel string data. Two sets of sub-pixel string data may form a set of display data.

Referring to FIG. 3, the CPU may include four processing units and may be able to process and obtain four sets of sub-pixel string data or two sets of display data simultaneously. It should be noted that, the CPU may also include only two processing units and may be able to process two sets of sub-pixel string data or one set of display data simultaneously.

According to the scanning sequence of the display panel, in a driving group, the driving timings of two sets of pixel data may be separated by one clock cycle. Referring to FIG. 3, the CPU may include four processing units. The difference in driving timings between two sets of display data with corresponding or same sequence numbers, in adjacent driving groups, may be four clock cycles. That is, the difference in driving timings between two sets of display data in corresponding positions, in adjacent driving groups, may be four clock cycles. Referring to FIG. 2, for both the driving IC and the display panel, when receiving digital RBG signals, the operation may be controlled by the pixel clock signals. Each circuit in the driving IC and the display panel may only read the digital RGB signals at the rising edge or the falling edge of a pixel clock signal to ensure the accuracy of the data read.

In one embodiment, the display panel may scan the pixel structures by progressive scanning or interlaced scanning. Preferably, in certain embodiments, the array of M×N pixel structures may be scanned using progressive scanning such that existing driving programs can be used.

Specifically, referring back to FIG. 3, the method for driving display panel may include steps T1 to T4 (T4 not shown in FIG. 3).

Step T1 may be a data collection step. In step T1, first pixel data for every six rows or columns corresponding to a resolution of K×L may be collected. Further, the first pixel data may be transferred or inputted to caches. The first pixel data may correspond to the pixel data in embodiment one. The caches may correspond to the primary caches in embodiment one.

Each set of first pixel data may include three color components. When the sub-pixel data corresponding to the color components drives the control components of the display panel, the organic light-emitting diodes (OLEDs) in the pixel structures may emit light of corresponding colors or wavelengths. Alternatively, the liquid crystal in the pixel structures may change orientation so that the backlight may transmit through the color filters to generate light of corresponding colors or wavelengths. The color components may be sub-pixel data, corresponding to the first sub-pixel components in embodiment one. The generated or emitted light may include red light, green light, and blue light. The red light may have a wavelength range or color-displaying range of about 640-750 nm. The green light may have a wavelength range of about 480-550 nm. The blue light may have a wavelength range of about 450-480 nm.

The first pixel data may represent image data for a high resolution. For example, the first pixel data may include RGB three color components arranged as $R_{11}G_{11}B_{11}$, $R_{12}G_{12}B_{12}, \ldots, \ldots, R_{1n-1}G_{1n-1}B_{1n-1}$, and $R_{1n}G_{1n}B_{1n}$. The first subscript "1" indicates the set of image data is an input data. The second subscripts, from 2 to n, represent the sequence numbers of the image data in the corresponding rows or columns.

Step T2 may be a data processing step. In step T2, a color mixing process may be applied on the color components of the first pixel data to form second pixel data. Each set of second pixel data may include four color components. Two of the four color components may have the same color-displaying range. The two color components, with the same color-displaying range, may be separated by one other color component with a different color-displaying range. The second pixel data may correspond to the display data in embodiment one. The color components of the second pixel data may correspond to the second sub-pixel components in embodiment one.

Each set of second pixel data may include four color components. Two of the four color components may have the same color-displaying range. The two color components, with the same color-displaying range, may be separated by one other color component with a different color-displaying range. For example, the four color components may be arranged as RGBG, GRGB, GRGB or GBGR. For the four color components arranged as RGBG, the second pixel data may be $R_{21}G_{21}B_{21}G_{22}$, $R_{22}G_{23}B_{22}G_{24}, \ldots, R_{2m-1}G_{22m-3}B_{2m-1}G_{22m-2}$, and $R_{2m}G_{22m-1}B_{2m}G_{22m}$. The first subscript "2" indicates the set of image data is an output data. The second subscripts, from 1 to 2m, indicate the sequence numbers of the image data in the corresponding rows or columns.

In step T2, the CPU may perform the color mixing process on the color components in the first pixel data to form the second pixel data. The process to form the second pixel data may include two implementations.

In the first implementation, the color components with the same color-displaying range in the second pixel data may be obtained by reusing the color components in the six sets of first pixel data. The two other color components with the different colors may be obtained by applying the color mixing process on the color components of the three neighboring sets of first pixel data. The color components of the three neighboring sets in the first pixel data may have corresponding colors to two color components in the second pixel data. The color mixing process may be one or more of an averaging method, a weighted average method, a square root method, a median filtering method, or any other suitable methods.

In one embodiment, the CPU may include six processing units. The six processing units may be used to perform the color mixing process on the color components of three neighboring sets of first pixel data. The color components of the three neighboring sets of first pixel data may have corresponding colors to the two other color components in the second pixel data. An averaging method may be used. The processing of the first pixel data may be illustrated below.

The red color components of the second pixel data may be formed as follows.

$(R_{11}+R_{12}+R_{13})/3 \rightarrow R_{21}$;
$(R_{12}+R_{13}+R_{14})/3 \rightarrow R_{22}$; and
$(R_{13}+R_{14}+R_{15})/3 \rightarrow R_{23}$.

The blue color components of the second pixel data may be formed as follows.

$(B_{11}+B_{12}+B_{13})/3 \rightarrow B_{21}$;
$(B_{12}+B_{13}+B_{14})/3 \rightarrow B_{22}$; and
$(B_{13}+B_{14}+B_{15})/3 \rightarrow B_{23}$.

The green color components of the second pixel data may be formed as follows.

$G_{11} \rightarrow G_{21}$;
$G_{12} \rightarrow G_{22}$;
$G_{13} \rightarrow G_{23}$;
$G_{14} \rightarrow G_{24}$;
$G_{15} \rightarrow G_{25}$; and
$G_{16} \rightarrow G_{26}$.

In this case, each processing unit may collect one set of first pixel data and use the first pixel data collected by the three neighboring processing units to obtain a set of sub-pixel string data. Thus, six red color components of the six sets of first pixel data may be processed with the color mixing process to obtain three red color components. Six blue color components of six sets of first pixel data may be processed to obtain three blue color components. Six green color components of six sets of first pixel data may be maintained to obtain six green color components. As such, pixel data corresponding to images of high resolution may correspond to the pixel structures for a lower resolution. The three red color components, three blue color components and six green color components may be arranged as RGBG to form three sets of second pixel data. Thus, the display panel may display images with a resolution higher than the physical resolution of the display panel while maintaining fidelity of the displayed images.

In the second example, as shown in FIG. 5, the color components with the same color-displaying range in the second pixel data may be obtained by reusing the corresponding color components in the first pixel data. The other two color components with different color-displaying ranges in the second pixel data may be obtained by applying the color mixing process on the color components with corresponding colors in two neighboring sets of first pixel data. This example is illustrated below.

For example, by using $(R_{11}+R_{16})/2 \rightarrow R_{21}$, the set of red sub-pixel data of the display data, in the first position or the first set of red sub-pixel data, in the corresponding driving group can be obtained. $R_{16}$ may represent the sixth set of red sub-pixel data in a previous driving group. It should be noted that the first set of red sub-pixel data in the first driving group may be obtained by reusing the value of $R_{11}$, i.e., $(R_{11}) \rightarrow R_{21}$.

By using $(R_{12}+R_{13})/2 \rightarrow R_{22}$, the set of red sub-pixel data of the display data in the second position of the corresponding driving group can be obtained.

By using $(R_{13}+R_{14})/2 \rightarrow R_{23}$, the set of red sub-pixel data of the display data in the third position of the corresponding driving group can be obtained.

It should be noted that, for viewing simplicity, the first subscripts of the sub-pixel data are omitted in FIG. 4. Direction of the arrows and text labels may represent the input data and output data indicated by the first subscripts.

In the embodiments described above, the color mixing process using an averaging method is applied on color components with different color-displaying ranges, e.g., the red color components and the blue color components, for illustrative purposes. It should be noted that a weighted average method, a square root method, a median filtering method, and/or or any other suitable methods may also be used in the color mixing process for color components with different color-displaying ranges. Similarly, a color mixing process, using any one of the averaging method, a weighted average method, a square root method, and a filtering method, may also be applied on the color components with the same color-displaying range, e.g., the green color components. The specific method used in the color mixing process can be adjusted or determined according to different applications or designs and should not be limited by the embodiments herein.

Another method for the color mixing process may be forming a mapping table in step T2. The mapping table may provide the second pixel data formed by applying the color mixing process on the first pixel data using the two implementation described above. During the driving process, the display panel may query the mapping table to convert the first pixel data to the second pixel data in a shorter time. Operational efficiency of the display panel may be improved. The input data of the mapping table may be the two sets of sub-pixel data in the first pixel data, where the first pixel data may correspond to the resolution of K×L. The output data of the mapping table may be sub-pixel data corresponding to the resolution of M×N, wherein the sub-pixel data may include the color data for the images with the resolution of M×N.

Step T3 may be a data preparation step. In step T3, the display data may be transferred to registers. The registers may be the secondary caches in embodiment one.

In step T3, the sub-pixel data of the second pixel data obtained in step T2 may be transferred to the registers and stored in the registers for subsequent operations such as being outputted for displaying images.

Pipeline processing may be used to describe the simultaneous operation of data collection, data processing, and data preparation for the driving groups. FIG. 3 illustrates the processing units operated as pipelines for data processing. Each pipeline may be operated on the clock cycles. The timing of operation on pixel data by two adjacent pipelines may be separated by one clock cycle. The data transfer and processing of pipelines during the color mixing process may not be affected by the difference in operational timing between pipelines. The pixel data collected by the next pipeline, in the clock cycle of the data collection process, may be used as the first pixel data for the color mixing process of the present processing unit. For example, the pixel data collected by pipeline 2 in the data collection process may be used as the first pixel data for the color mixing process of pipeline 1.

As shown in FIG. 3, the CPU may include four processing units. The four processing units may form four pipeline processing operations. i sets of first pixel data may form a driving group. Each set of the first pixel data may be transferred to a processing unit to form a set of sub-pixel string data. Each processing unit may be operated repeatedly to form a pipeline processing operation. Based on the correspondence relation between the first pixel data and the sub-pixel string data for forming the second pixel data, the six sets of first pixel data in the same driving group may be used to obtain six sets of sub-pixel string data. The six sets of first pixel data may correspond to the 18 sets of first sub-pixel data in embodiment one. The six sets of sub-pixel string data may correspond to the three sets of display data or 12 sets of second sub-pixel data in embodiment one. As shown in FIG. 3, the timing of two adjust pipeline processing operations in the same CPU may be separated by one clock cycle. Each of the four pipeline processing operations may include the repeating operation or loop operation of the corresponding processing unit from the primary caches to the CPU, from the CPU to the secondary caches, and from the secondary caches to the primary caches.

Specifically, as shown in FIG. 3, pipeline 1 may start operating in the first clock cycle. When the pixel data received by the primary caches are transferred to the CPU, the CPU may start processing the pixel data. The primary caches may continue to receive pixel data and transfer the received pixel data to the CPU. Pipeline 2 may start operating in the second clock cycle. Because the transfer of one set of pixel data may require one clock cycle, the starting time of pipeline 2 and the starting time of pipeline 1 may be separated by one clock cycle. Likewise, after four clock cycles, four pipelines may be operated repeatedly in loop operations until the displaying of images ends.

That is, in the first clock cycle, only pipeline 1 start may start to collect first pixel data for a first loop. The data collection process may correspond to step T1 of the data transfer method in embodiment one.

In the second clock cycle, pipeline 1 may start processing the first pixel data collected in the first clock cycle to obtain second pixel data. The data processing step may correspond to step T2 of the data transfer method in embodiment one. Meanwhile, pipeline 2 may start to collect first pixel data for the first loop.

In the third clock cycle, pipeline 1 may prepare the second pixel data obtained in the second clock cycle, i.e., store the second pixel data. The data preparation step may correspond to step T3 of the data transfer method in embodiment one. Pipeline 2 may process the first pixel data collected in the corresponding first clock cycle. Meanwhile, pipeline 3 may start to collect first pixel data for the first loop. The dashed line in FIG. 3 may be used to illustrate the end of the first loop for each pipeline.

In the fourth clock cycle, pipeline 1 may start to collect first pixel data for a second loop. Pipeline 2 may prepare the second pixel data obtained in the corresponding third clock cycle. Pipeline 3 may process the first pixel data collected in the corresponding first clock cycle. Meanwhile, pipeline 4 may start to collect first pixel data for the first loop.

In the fifth clock cycle, pipeline 1 may process the first pixel data collected in the fourth clock cycle. Pipeline 2 may start to collect first pixel data for the second loop. Pipeline 3 may prepare the second pixel data obtained in the corresponding second clock cycle. Meanwhile, pipeline 4 may process the first pixel data collected in the corresponding first clock cycle.

Thus, in the third clock cycle, pipeline 1 in the driving group may have already completed a loop operation including the data or input collection step, the data processing step, and the data preparation step. The second pixel data may have been transferred to the secondary caches to be stored. When the sixth clock cycle ends, pipeline 4 in the driving group may have also completed the loop operation of data collection, data processing, and data preparation. In the driving process described above, the four pipelines in a plurality of driving groups, corresponding to the duplicated logic unit 10, may be operated in loop operations simultaneously. Thus, using the primary caches with small capacity for the storing of the eighteen sets of sub-pixel data, data collection, data processing, and storing of display data into the caches may be operated simultaneously.

Specifically, the timing and operation pattern of the data collection, data processing, and the data preparation shown in FIG. 3 illustrate the color mixing process. The physical resolution of the display panel for accepting the second pixel data may be 800×480, corresponding to an M×N array of pixel structures. The pixel data inputted into the display panel corresponds to a resolution of 800×720, corresponding to a K×L array of pixel structures. Further, the input pixel data may include sub-pixel data for RGB. The pixel data for each row of 720 pixel structures may include 720 sets of pixel data, which may represent 2160 sets of sub-pixel data. During the data processing, the color mixing process may be applied on the 720 sets of pixel data to obtain 480 sets of second pixel data for each row of pixel structures. The 480 sets of second pixel data may represent 1920 sets of sub-pixel data. The second pixel data may be outputted to the display panel through the driving IC. Thus, 720 sets of pixel data may be displayed as 480 pixel structures each row. Accordingly, display panel with a certain physical resolution may be used for displaying images corresponding to a higher resolution.

Further, in the data processing step of the driving method described above, the CPU may be used to process the pixel data information of a driving group (the smallest duplicated logic unit shown in FIG. 4) based on a time-sharing operation to generate pixel output data accordingly. Thus, only a small amount of caches and one CPU are required for the operation. For example, only caches or registers for 6 sets of pixel data (18 sets of sub-pixel data) are required. However, in conventional driving technology, pixel data are often processed to generate pixel output data after pixel data information and the frame pixel data information are stored. The processing of pixel data in the conventional driving technology may correspond to the data preparation step in the present disclosure. In this case, the caches may need to be able to store at least 2160 sets of sub-pixel data (or even 480×2160 sets of sub-pixel data). The disclosed driving method thus may reduce the number of caches or registers, for storing pixel data in the driving IC, to only one percent of the number of caches or registers used in the conventional driving technology. A display panel with a lower physical resolution may be used to display images corresponding to a higher resolution. That is, a relatively small number of caches or registers may be used for displaying images of high resolutions. The number of registers or caches in the driving IC may be reduced and the power consumption of the driving IC may be reduced.

Meanwhile, in the disclosed driving method, the display panel may drive driving groups in loop operations. The delay between input pixel data collection and displaying output display data may only be h clock cycles. Compared to the conventional driving technology, in which the delay is equal to at least the number of clock cycles for a row of pixel structures, the delay in the disclosed driving method, between input pixel data collection and displaying output display data, can be greatly reduced. For example, for the resolutions and four processing units described above, the ratio of the delay in the disclosed driving method to the delay in the conventional driving technology may be close to 1% (18/2160=0.8%).

Step T4 (not shown) may be a data display step. In step T4, the display panel may sequentially output the second pixel data stored in the caches or register to pixel structures arranged in a row of an M×N array. The second pixel data may be obtained from the pixel data in a row of pixel structures. Each pixel structure may include four sets of sub-pixel structures. At least one sub-pixel structure has the same color as another sub-pixel structure.

In step T4 (not shown), the second pixel data, obtained from the pixel data and stored in the caches, may be sequentially outputted or transferred into the driving IC of the display panel. The second pixel data may correspond to pixel structures in a row of the display panel. The driving IC may transfer the second pixel data to the corresponding row in the M×N array of pixel structures.

The disclosed driving method may be implemented in suitable programming languages. For example, field-programmable gate array (FPGA) and hardware description language (HDL) may be used to implement the disclosed driving method.

It should be noted that, the disclosed driving method should not be limited to the embodiments described above. That is, the disclosed driving method should not be limited to the conversion and data transfer from the six sets of first pixel data to the three sets of second pixel data. Based on the ratio of pixel data of a higher resolution to pixel structures of a lower resolution, other ratio of the sets of first pixel data to the sets of second pixel data may also be used. It is only required that the CPU can be operated in loop operations to obtain the conversion from the first pixel data to the second pixel data. The specific ratio of the sets of first pixel data to the sets of second pixel data is not limited herein.

In the disclosed driving method, by using driving groups in loop operations, a display panel with a certain physical resolution may be used to display a resolution higher than the physical resolution of the display panel. Also, the disclosed method requires less cache or register capacity. The delay between inputting pixel data and outputting display or pixel data may be reduced. The disclosed method thus may have improved real-time performance.

Accordingly, the present disclosure provides a display panel. The display panel implements the disclosed driving method to drive the display panel.

The display panel may be an OLED display panel or an LCD display panel. In an OLED display panel, the driving IC may directly receive the second pixel data from the caches or registers. The OLED display panel may adjust the gamma grayscale for displaying images. The driving process or program for the OLED display panel may be the same as the conventional driving technology and is not repeated herein.

In the disclosed driving method and the related display panel, repeatedly used driving groups and real-time data processing by multiple pipeline processing are implemented in HRA to simplify the design of the driving IC. Thus, a display panel with a lower physical resolution may be used to display images for a higher resolution. The number of caches or registers may be reduced, and the capacity of the caches or registers may also be reduced. The power consumption of the driving IC can be reduced, and the fabrication cost of the display panel can be reduced.

The present disclosure also provides a display device incorporating the disclosed display panel.

The display device may be an LCD panel, a set of electronic paper, an OLED panel, a mobile phone, a tablet computer, a television, a monitor, a laptop computer, a digital photo frame, a navigation system and other products and/or any parts with display functions.

The display device may incorporate the display panel provided by embodiment two. The cost of the driving IC of the display panel may be lower. The display panel may have reduced delay when displaying images. Accordingly, the display device may be fabricated with lower cost and may have improved real-time display performance.

It should be understood that the exemplary embodiments disclosed above are intended for illustrating the operation principles of the present invention. The present invention is not limited thereto. Anyone skilled in the art may make various changes and modifications without departing from the spirit and scope of the present invention. Therefore the scope of the present invention should be defined by the claims thereof.

What is claimed is:

1. A method for transferring data for displaying images at a first resolution to a display panel of a second resolution, the first resolution being higher than the second resolution, comprising steps of:
   sequentially collecting pixel data and storing the pixel data into primary caches;
   after collecting a portion of the pixel data for one row of pixel structures of the first resolution, sequentially transferring the portion of the pixel data stored in the primary caches to a central processing unit (CPU);
   after transferring the portion of the pixel data for one row of pixel structures of the first resolution, applying a color mixing process to received pixel data according to a time-sharing operation to generate display data, during which the same CPU is used repeatedly for different or consecutive loop operations;
   after processing the portion of the pixel data for one row of pixel structures of the first resolution, sequentially transferring the display data to secondary caches; and
   repeating steps for collecting pixel data, transferring collected pixel data from primary caches to the CPU, applying the color mixing process to generate display data, and transferring the display data to secondary caches until pixel data for a row of pixel structures corresponding to the first resolution are processed and stored in the secondary caches as display data, and transferring the display data to a row of pixel structures corresponding to the second resolution.

2. The method according to claim 1, wherein:
   the pixel data for the first resolution includes K sets of pixel data for one row of pixel structures, K being positive multiple of 2; and
   the pixel structures corresponding to the second resolution includes M pixel structures in one row, M being a positive integer equal to or smaller than K.

3. The method according to claim 2, wherein:
   when the secondary caches receive M sets of display data obtained from K sets of pixel data for one row of pixel structures, the display data are transferred to M pixel structures in the display panel.

4. The method according to claim 1, wherein a timing to transfer a set of pixel data to the CPU and a timing to transfer an adjacent set of pixel data to the CPU are separated by one clock cycle.

5. The method according to claim 2, wherein:
   sequentially transferring the pixel data stored in the primary caches to the CPU includes sequentially transferring first i sets of pixel data to the CPU when at least i sets of pixel data are stored in the primary caches, K/i being a positive integer, and i being an integer multiple of 2;
   applying the color mixing process to the received pixel data includes the CPU receiving the i sets of pixel data and applying the color mixing process on the i sets of pixel data to obtain j sets of display data, j being an integer smaller than i, and a number of sub-pixel components in i sets of pixel data being larger than a number of sub-pixel components in j sets of display data; and sequentially transferring the display data to the secondary caches includes sequentially transferring the j sets of display data to the secondary caches.

6. The method according to claim 5, wherein a timing to transfer a group of i sets of pixel data to the CPU and a timing to transfer an adjacent group of i sets of pixel data to the CPU are separated by h clock cycles, h being a positive even integer larger than or equal to 2.

7. The method according to claim 6, wherein the CPU includes h processing units, each executing the steps for collecting pixel data, transferring collected pixel data from primary caches to the CPU, applying the color mixing process to generate display data, and transferring the display data to secondary caches.

8. The method according to claim 1, wherein:
a set of pixel data includes data for a plurality of first sub-pixel components of different colors; and a set of display data includes data for a plurality of second sub-pixel components, a portion of the second sub-pixel components having a same color.

9. The method according to claim 8, wherein applying the color mixing process to the received pixel data includes:
applying the color mixing process on neighboring first sub-pixel components of corresponding colors to obtain second sub-pixel components of different colors, or reusing first sub-pixel components of corresponding colors to obtain the second sub-pixel components of different colors; and
applying the color mixing process on neighboring first sub-pixel components of corresponding colors to obtain second sub-pixel components of the same color, or reusing first sub-pixel components of corresponding colors to obtain the second sub-pixel components of the same color.

10. The method according to claim 9, further comprising applying the color mixing process on the first sub-pixel components of i sets of pixel data to obtain j sets of display data, wherein:
i is an integer multiple of 2 and j is an integer smaller than i;
a set of pixel data includes three first sub-pixel components, each have a different color from another;
a set of display data includes four second sub-pixel components, two of the four second sub-pixel components having a same color and other two of the four second sub-pixel components each having a different color than each other and the two second sub-pixel components of the same color, the two second sub-pixel components of the same color are separated by one other sub-pixel component of a different color; and
one of the two second sub-pixel components of the same color and a neighboring second sub-pixel component of a different color form a set of sub-pixel data, two sets of sub-pixel data form a set of display data.

11. The method according to claim 9, wherein the color mixing process further includes:
forming a two dimensional mapping table including the correspondence relation between a first sub-pixel component and a second sub-pixel component before the color mixing process; input data of the mapping table including brightness levels of two first sub-pixel components of the same color; and output data of the mapping table including integrated brightness levels of second sub-pixel components of corresponding colors to the first sub-pixel components; and
inputting neighboring first sub-pixel components as the input of the mapping table for querying output data of corresponding colors to obtain second sub-pixel components of the display data.

12. The method according to claim 10, wherein:
the pixel data includes red sub-pixel components, green sub-pixel components, and blue sub-pixel components;
the two second sub-pixel components of the same color are green sub-pixel components;
a set of sub-pixel string data includes a combination of a red sub-pixel component and a green sub-pixel component and a combination of a blue sub-pixel component and a green sub-pixel component, or a combination of a green sub-pixel component and a red sub-pixel component and a combination of a green sub-pixel component and a blue sub-pixel component; and
a set of display data includes two sets of sub-pixel string data, the two green sub-pixel components being separated by a sub-pixel component of a different color.

13. The method according to claim 9, wherein:
each set of pixel data forms a set of sub-pixel string data through the color mixing process; and
i sets of sub-pixel string data form j sets of display data, i being an integer multiple of 2 and j=i/2.

14. A method for driving a display panel, including the method of claim 2, wherein display data formed based on pixel data for one row of K pixel structures is configured to drive one row of M pixel structures.

15. The method according to claim 14, wherein the pixel data for one row of K pixel structures are processed by pipeline processing sequentially in the primary caches, the CPU, and the secondary caches to form display data for one row of M pixel structures.

16. A data transfer module, configured to transfer data for a first resolution to a display panel of a second resolution for displaying, the first resolution being higher than the second resolution, comprising:
primary caches, configured to receive pixel data sequentially, store the pixel data sequentially in the primary caches, and, after collecting a portion of the pixel data for one row of pixel structures of the first resolution, sequentially transfer the pixel data to a central processing unit (CPU);
the CPU, configured to:
receive the pixel data and apply a color mixing process on the pixel data according to a time-sharing operation to obtain display data, during which the same CPU is used repeatedly for different or consecutive loop operations, and
transfer the display data to secondary caches; and
the secondary caches, configured to receive the display data, store the display data in the secondary caches, and transfer the display data to a row of pixel structures.

17. The data transfer module according to claim 16, wherein:
the pixel data for the first resolution includes K sets of pixel data for one row of pixel structures, K being positive multiple of 2; and
the pixel structures corresponding to the second resolution includes M pixel structures in one row, M being a positive integer equal to or smaller than K.

18. The data transfer module according to claim 17, wherein when the secondary caches receive M sets of display data obtained from K sets of pixel data for one row of pixel structures, the display data are transferred to M pixel structures in the display panel.

19. The data transfer module according to claim 16, wherein:
- the primary caches sequentially transfers first i sets of pixel data to the CPU when at least i sets of pixel data are stored in the primary caches, K/i being a positive integer, and i being an integer multiple of 2;
- the CPU receives the i sets of pixel data and applies the color mixing process on the i sets of pixel data to obtain j sets of display data, j being an integer smaller than i, and a number of sub-pixel components in i sets of pixel data being larger than a number of sub-pixel components in j sets of display data; and
- the CPU sequentially transfers the j sets of display data to the secondary caches.

20. The data transfer module according to claim 19, wherein:
- a set of pixel data includes a plurality of first sub-pixel components of different colors; and a set of display data includes a plurality of second sub-pixel components, a portion of the second sub-pixel components having a same color; and
- the CPU includes h processing units for repeatedly receiving pixel data from K/i groups, the processing units receiving the pixel data and applying the color-mixing process on the pixel data to obtain the display data, h being an even number larger than or equal to 2, applying the color-mixing process on the pixel data including:
  - applying the color mixing process on neighboring first sub-pixel components of corresponding colors to obtain second sub-pixel components of different colors, or reusing first sub-pixel components of corresponding colors to obtain the second sub-pixel components of different colors; and
  - applying the color mixing process on neighboring first sub-pixel components of corresponding colors to obtain second sub-pixel components of the same color, or reusing first sub-pixel components of corresponding colors to obtain the second sub-pixel components of the same color.

21. The data transfer module according to claim 20, wherein:
- a set of pixel data includes three first sub-pixel components, each have a different color from another;
- a set of display data includes four second sub-pixel components, two of the four second sub-pixel components having a same color and other two of the four second sub-pixel components each having a different color than each other and the two second sub-pixel components of the same color, the two second sub-pixel components of the same color are separated by one other sub-pixel component of a different color;
- one of the two second sub-pixel components of the same color and a neighboring second sub-pixel component of a different color form a set of sub-pixel data, two sets of sub-pixel data form a set of display data; and
- applying the color mixing process on the first sub-pixel components of i sets of pixel data to obtain j sets of display data.

22. A display device, including a display screen incorporating the data transfer module of claim 16.

* * * * *